W. A. JOHNSON & J. M. ROBBINS.
FRUIT GATHERER.
APPLICATION FILED JUNE 9, 1917.
1,293,460.
Patented Feb. 4, 1919.
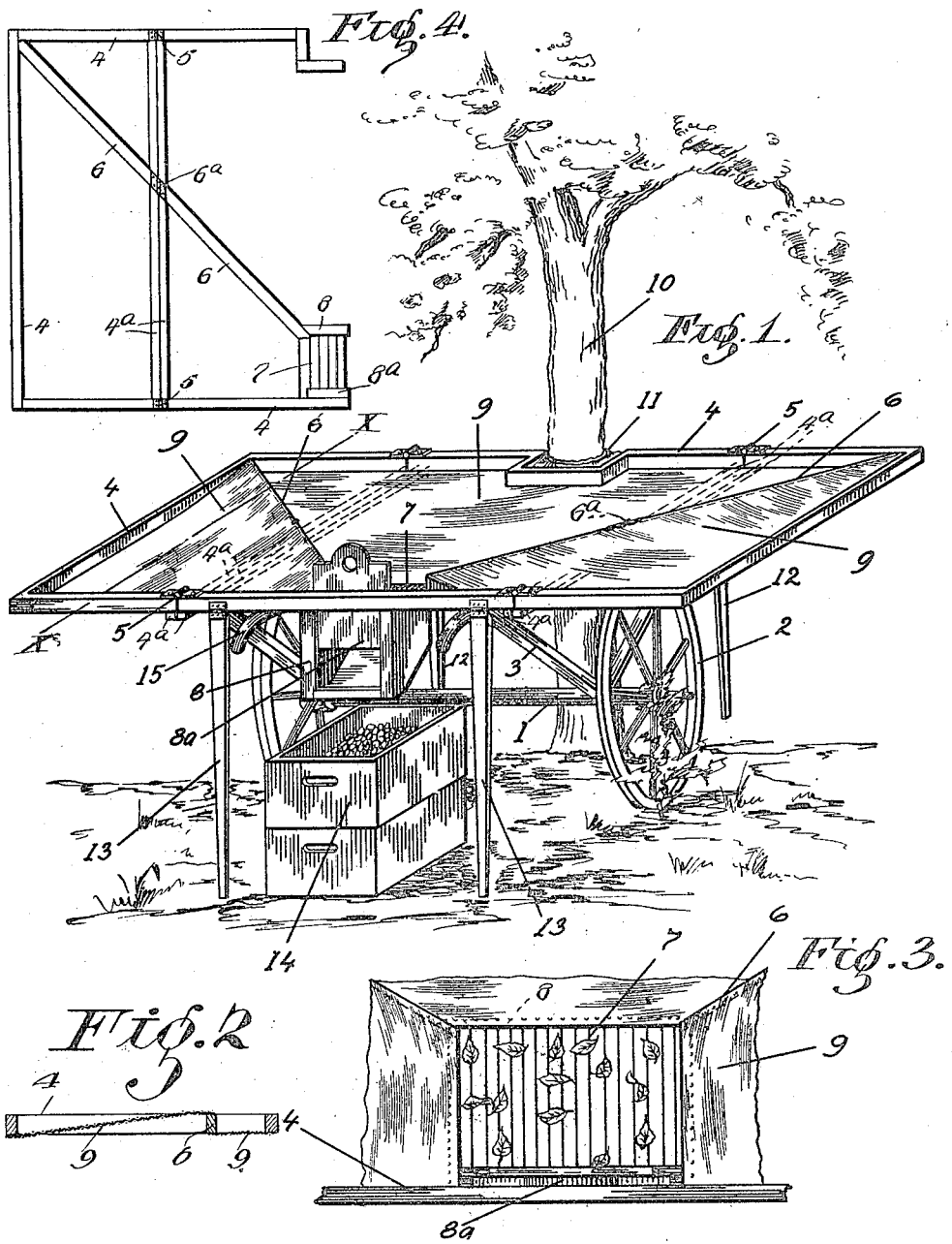
WITNESS.
Bernard Privat
INVENTORS.
William A. Johnson
J. M. Robbins
BY Percy S. Webster
ATTORNEY.

UNITED STATES PATENT OFFICE.

WILLIAM A. JOHNSON, OF BRANSCOMB, AND JACOB M. ROBBINS, OF HEALDSBURG, CALIFORNIA.

FRUIT-GATHERER.

1,293,460.   Specification of Letters Patent.   Patented Feb. 4, 1919.

Application filed June 9, 1917. Serial No. 173,772.

*To all whom it may concern:*

Be it known that we, WILLIAM A. JOHNSON, a citizen of the United States, residing at Branscomb, in the county of Mendocino, State of California, and JACOB M. ROBBINS, a citizen of the United States, residing at Healdsburg, in the county of Sonoma, State of California, have invented certain new and useful Improvements in Fruit-Gatherers; and we do declare the following to be a full, clear, and exact description of the same, reference being had to the accompanying drawings, and to the characters of reference marked thereon, which form a part of this application.

This invention relates to improvements in fruit gathering sheets. The object of the invention is to produce a portable gathering sheet which may be collapsed into compact form for transportation from one point to another. The sheet is suitably mounted on wheels which serves the double function of making the device portable and at the same time renders it extremely easy to tilt the same to or from the tree as it is desired, first to shake the fruit upon the sheet and then to collect the same into the boxes.

A further object of the invention is to produce a simple and inexpensive device and yet one which will be extremely effective for the purposes for which it is designed.

These objects we accomplish by means of such structure and relative arrangement of parts as will fully appear by a perusal of the following specification and claim.

In the drawings similar characters of reference indicate corresponding parts in the several views.

Figure 1 is a perspective view of the device showing it as it would appear just as the fruit has been emptied therefrom.

Fig. 2 is a sectional view (reduced size) taken on a line X—X of Fig. 1.

Fig. 3 is a fragmentary view showing how the leaves and twigs from the trees are screened from the fruit.

Fig. 4 is a half top plan view of the frame with the canvas removed showing the deflecting and cross boards thereon.

Referring now more particularly to the characters of reference on the drawings the numeral 1 designates an axle which is disposed substantially centrally of the entire device and on the ends of which are mounted wheels 2. A suitable supporting frame work 3 supports a rectangular frame 4 upwardly from the axle 1, the ends of the said frame 4 being hinged as at 5 to allow of the same being collapsed into compact form when it is to be transported from one point to another. Under the hinged ends of the frame 4 are cross boards 4ª, on which are secured the abutting ends of deflecting boards 6, which are on a plane with the frame 4 and converge toward each other to a point adjacent a screen 7 secured across the top of an inclined chute 8, having a lift gate 8ª. These boards have their abutting edges hinged together by hinges 6ª, these hinges being in line with the hinges 5 on the frame 4. These boards are further secured to the frame 4 at the opposite corners thereof, and also to the frame of the chute 8. The canvas or sheet 9 is secured to the frame 4 in any suitable manner. Along the outer sides of the top edges of the boards 6 toward the inner side of the device this sheet 9 is secured to the top edges of said boards. From the inner side of said boards 6 this sheet 9 is secured to the bottom edges of said boards as shown in Fig. 2 by tacks or any other suitable means. By means of this latter construction the fruit which falls upon the sheet when the tree is being picked can readily roll over the boards 6 but, when the device is tilted in the opposite direction, the boards 6 will present obstacles to the fruit and direct the same to the screen 7 in a manner as will presently appear.

The part of the sheet 9 which engages the tree 10 is gathered as at 11 and provided with an elastic so as to make a tight joint around the tree.

The inner edge of the frame 4 is provided with short legs 12. The outer edge is provided with longer legs 13 hinged to the frame 4 so they may be set at any desired angle. In practice there are two of the devices used for gathering the fruit from each tree, one is pushed against the tree from one side and the other from the opposite side and the edges of the adjacent boards are put very close together or even overlap slightly so as not to leave any space between them for the fruit to fall through. When the fruit is being shaken from the tree the frame 4 is inclined downwardly from its outer edge to its inner edge, the inner edge being supported on the legs 12. The legs 13 may be inclined at any desired angle by means of their hinged connection to allow of the frame being set accurately at any inclination desired. The fruit is then shaken from the tree and falls upon the sheet 9 and rolls down into the space between the flat sides of the boards 6. When it is desired to clear the fruit from the sheet the frame 4 is tilted in the opposite direction. The flat sides of the deflecting boards 6, then guide the fruit toward the screen 7 where the leaves and twigs are screened therefrom and the fruit proper passes into the chute 8 and out of the lift gate 8$^a$ into the boxes or other receptacles 14. The tilting operation in one direction or the other, of the frame 4, is made very easy by reason of the wheels 2 acting as the pivot, since such wheels not only provide the pivotal point as stated but also support the weight of the device and of the fruit. Such wheels also render it very easy to transport the device from one tree to another. The frame 4 may be provided with handles 15 by which it can be easily manipulated.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described our invention what we claim as new and useful and desire to secure by Letters Patent is:

A fruit gatherer comprising a rectangular frame supported for tilting movement and provided with an outlet to discharge the fruit into a container, flat deflecting boards secured to and set vertically edgewise between the sides of the frame and converging toward the outlet, their ends adjacent the outlet being spaced apart to permit the fruit to pass through to such outlet, a sheet on the frame, that portion of the sheet on the outer side of the deflecting boards being secured to the top edges of said boards and that portion on the opposite side being secured to the under edges of said boards, whereby when the frame is tilted in one direction the fruit can roll over the top edges of the boards but when tilted in the opposite direction the fruit will engage the flat sides of the boards and be deflected into the outlet.

In testimony whereof, we affix our signatures in the presence of witnesses.

WILLIAM A. JOHNSON.
JACOB M. ROBBINS.

Witnesses to William A. Johnson:
SETH TRACY,
ELIJAH A. VANN.
Witness to Jacob M. Robbins:
R. A. VITOUSEK.

Copies of this patent may be obtained for five cents each, by addressing the "Commissioner of Patents, Washington, D. C."